US007092697B1

(12) United States Patent
Kupsh et al.

(10) Patent No.: US 7,092,697 B1
(45) Date of Patent: Aug. 15, 2006

(54) METHOD AND SYSTEM FOR REDUCED-LATENCY PREPAID MOBILE MESSAGING

(75) Inventors: Jerry Kupsh, Concord, CA (US); Xuming Chen, Walnut Creek, CA (US); Ben Chen, Northboro, MA (US); Robert Ephraim, Bridgewater, NJ (US)

(73) Assignee: Cellco Partnership, Bedminster, NJ (US)

( * ) Notice: Subject to any disclaimer, the term of this patent is extended or adjusted under 35 U.S.C. 154(b) by 226 days.

(21) Appl. No.: 10/337,240

(22) Filed: Jan. 6, 2003

(51) Int. Cl.
*H04M 11/00* (2006.01)
*H04Q 7/20* (2006.01)

(52) U.S. Cl. .................. 455/406; 455/408; 455/466; 379/114.2

(58) Field of Classification Search ............. 455/406, 455/407, 408, 412.1, 412.2; 379/88.13, 88.22, 379/88.25, 114.2, 114.28, 114.29, 115.01
See application file for complete search history.

(56) References Cited

U.S. PATENT DOCUMENTS

| | | | | |
|---|---|---|---|---|
| 5,265,033 A | * | 11/1993 | Vajk et al. ............. | 709/206 |
| 5,995,822 A | * | 11/1999 | Smith et al. ............ | 455/406 |
| 6,418,202 B1 | * | 7/2002 | Caldwell et al. ........ | 379/88.25 |
| 6,625,439 B1 | * | 9/2003 | Laybourn et al. ....... | 455/407 |
| 6,757,531 B1 | * | 6/2004 | Haaramo et al. ........ | 455/414.1 |
| 6,801,781 B1 | * | 10/2004 | Provost et al. .......... | 455/466 |
| 2002/0029189 A1 | | 3/2002 | Titus et al. | |
| 2003/0091169 A1 | * | 5/2003 | Cain ...................... | 379/114.2 |
| 2003/0091170 A1 | * | 5/2003 | McCann et al. ......... | 379/114.2 |
| 2003/0216147 A1 | * | 11/2003 | Morin et al. ............ | 455/466 |
| 2004/0082348 A1 | * | 4/2004 | Gabriel et al. .......... | 455/466 |
| 2004/0117304 A1 | * | 6/2004 | Kastelewicz et al. .... | 705/40 |
| 2004/0147245 A1 | * | 7/2004 | Kastelewicz et al. .... | 455/406 |

OTHER PUBLICATIONS

TIA/EIA Standard 637-A, "Short Message Services for Spread Spectrum Systems", Apr. 1999.
TIA/EIA/IS-637-B, Short Message Services for Wideband Spread Spectrum Systems:, Jan. 2002.

* cited by examiner

*Primary Examiner*—Binh K. Tieu
(74) *Attorney, Agent, or Firm*—Darby & Darby

(57) ABSTRACT

A method and system for facilitating prepaid mobile messaging. Mobile messages are forwarded to their intended one or more destinations before the debit account of the one or more prepaid mobile messaging subscribers associated with the mobile message are debited.

34 Claims, 2 Drawing Sheets

METHOD AND SYSTEM FOR REDUCED-LATENCY PREPAID MOBILE MESSAGING

Prepaid mobile voice services have been known for some time. These prepaid services allow a wireless mobile subscriber to allocate a predetermined minimum amount of funds to a debit account associated with the subscriber. All calls thereafter made by the prepaid subscriber on the wireless voice network are debited against the subscriber's prepaid account in real time. The mobile call is disallowed or is disconnected when the subscriber's prepaid account contains an insufficient amount of funds to allow further talk time. Generally, a prepaid mobile voice system determines whether a sufficient amount of prepaid funds exist for a predetermined minimum amount of talk time before completing the call to the intended destination. Any mobile phone utilized for post-paid voice calling, i.e., credit-based calling, can be utilized for prepaid mobile voice calling without modifying the mobile phone in any way.

In addition to voice capabilities, most presently available mobile telephones include mobile messaging capability. Mobile messaging allows a mobile subscriber to send and receive text and multi-media-based messages using the subscriber's mobile handset. For example, Nokia®, Ericcson®, Kyocera®, and Samsung® each manufacture mobile phones which allow a wireless subscriber to send and receive SMS messages in an IS-95-based Code Division Multiple Access (CDMA) system in accordance with TIA/EIA-637-A or B, which are well known standards in the industry. Mobile messaging capability is also available for mobile handsets operating in wireless networks other than CDMA-based networks, such as IS-136-based TDMA networks, GSM-based systems and W-CDMA networks.

U.S. Patent Application Publication 2002/0029189 A1 (hereinafter, "the '189 applications"), which is titled "Prepaid Short Messaging," discusses a solution for providing prepaid mobile messaging services. Upon receiving a mobile message sent from or to a prepaid subscriber, the prepaid messaging system and method discussed in the '189 application determines if a prepaid subscriber has a sufficient prepaid mobile messaging account balance to allow delivery of the mobile message before the mobile message is actually delivered. If the balance is sufficient, the mobile message is sent to its intended destination. If the balance is not sufficient then the mobile message is not sent.

Unfortunately, the system and method for prepaid mobile messaging described in the '189 application may be prone to latency. More particularly, in the system and method of the '189 application, a mobile message sent from or to a prepaid subscriber is held in the mobile messaging network while a database having the prepaid subscriber's account balance is checked for sufficient funds. Holding the mobile message in the messaging network while the account balance is referenced introduces a delay in message delivery. When multiple mobile messages are being processed, the delay is compounded and the load on the messaging network is increased, thus adversely affecting not only delivery of prepaid subscriber's mobile messages, but those of credit-based mobile messaging subscribers as well.

It would be advantageous to provide a prepaid mobile messaging system that does not cause undue latency in the mobile messaging network.

SUMMARY

The present invention provides a method and system for facilitating prepaid mobile messaging which avoids the latency commonly experienced with known prepaid mobile messaging solutions. The method includes the steps of: (1) receiving a mobile originated message from a prepaid subscriber at a message center; (2) sending the mobile message toward its intended one or more destinations; and, (3) debiting a prepaid mobile messaging account associated with the prepaid subscriber by an amount of funds sufficient to cover the charge for the sent mobile message origination. Alternately or in addition to the above, the method may include the steps of: (1) receiving a mobile message addressed to a prepaid subscriber at a message center; (2) sending the mobile message to the addressed prepaid subscriber; and (3) debiting a prepaid mobile messaging account associated with the addressed party of the mobile message by the amount of funds sufficient to cover the charge for the sent mobile message termination.

A system of the present invention includes: (1) one or more databases for storing account balances associated with prepaid mobile messaging subscribers; and (2) one or more message centers for routing a mobile message. The mobile message is associated with one or more prepaid mobile messaging subscribers. Additionally, the one or more message centers are programmed to reference the one or more databases to debit the account balance associated with each of the one or more prepaid messaging mobile messaging subscribers after the one or more message centers route the mobile message to its one or more intended destinations.

BRIEF DESCRIPTION OF THE DRAWINGS

Additional details and variations of the invention will be described below by way of example with reference to the following drawings.

DETAILED DESCRIPTION OF AN EXEMPLARY EMBODIMENT OF THE PRESENT INVENTION

The exemplary embodiment of the present invention described herein includes a system and method for providing a prepaid mobile messaging service which does not introduce undue latency to the mobile messaging network and which does not otherwise adversely affect overall message delivery rates.

The exemplary embodiments described herein reference a mobile messaging network operating in accordance with TIA/EIA-637 A or B, known as the Short Messaging Service ("SMS"). Although the exemplary embodiments are described with reference to SMS messaging, it is understood that the present invention may be utilized by any mobile messaging system utilizing any known protocols and standards for mobile messaging. It is further understood that the present invention is applicable to any known wireless network carrier standards such as second and third generation wireless standards and their variations, e.g., CDMA, TDMA, GSM and WCDMA.

Moreover, the embodiments described herein advantageously utilize transaction—oriented messaging to communicate information between and among network components, e.g., to and from a database of prepaid credit allocated for prepaid messaging. One skilled in the art will appreciate, however, that the invention is equally applicable to embodiments that use inter-component communication methods other that transaction-oriented messaging.

Figure 1:
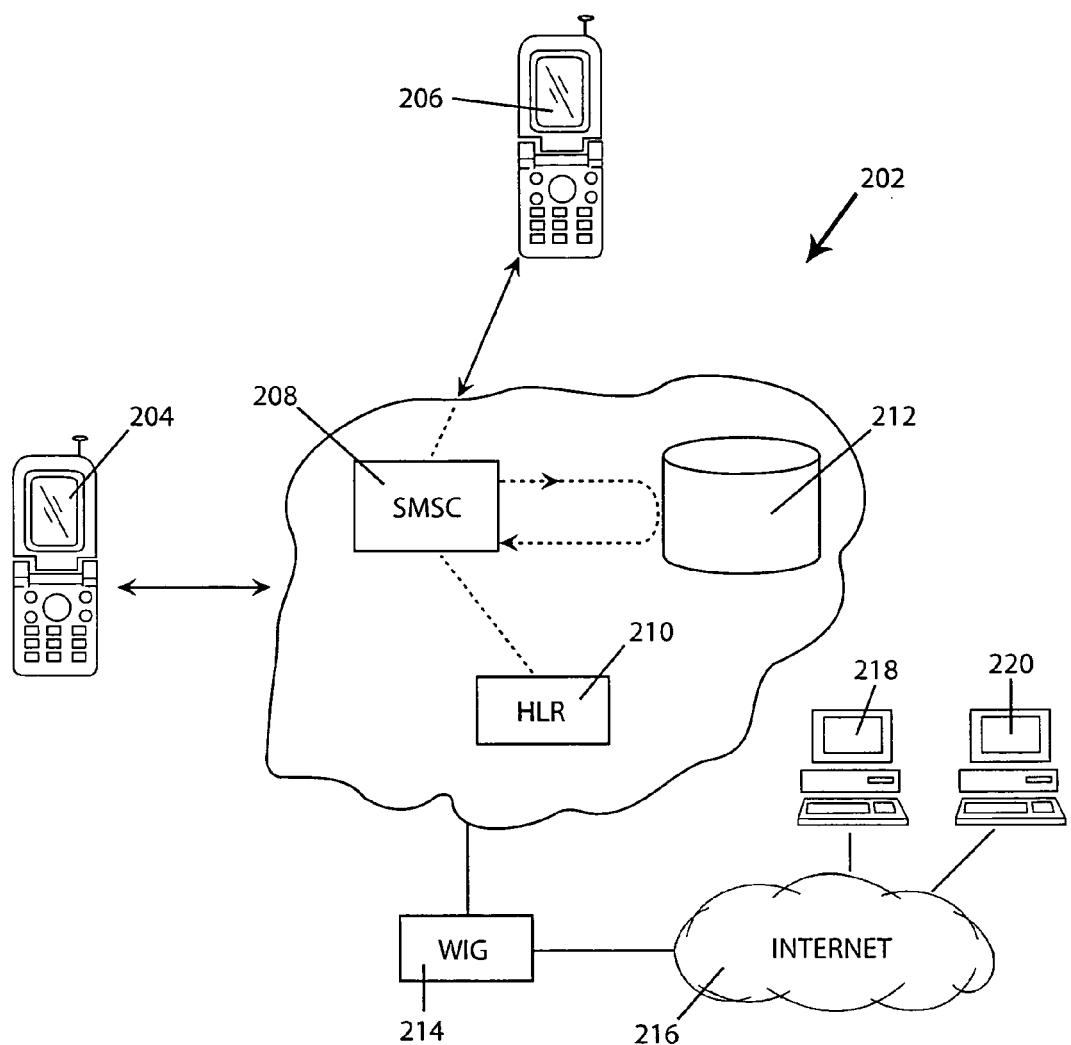
FIG. 1 illustrates an exemplary embodiment of a prepaid mobile messaging system designed in accordance with the present invention.

FIG. 1 illustrates an exemplary system of the present invention.

The system of FIG. 1 includes wireless network 202, which further includes components of a mobile messaging network to facilitate delivery and transmission of SMS messages to and from SMS-capable devices, e.g., mobile telephones 204 and 206. Wireless network 202 also includes components that facilitate voice and other data communications among wireless devices.

FIG. 1 illustrates wireless network 202 having a mobile message center, e.g., Short Messaging Service Centers (e.g., SMSC 208) which route mobile messages to their ultimate destination. Although only one SMSC is illustrated in FIG. 1, it is understood that wireless network 202 may include multiple interconnected SMSCs to facilitate mobile message functionality over wide geographic areas and for large subscriber bases.

Additionally, the system of FIG. 1 may include one or more Wireless Internet Gateways (WIG 214), which connect wireless network 202 with the Internet 216 or other wide area networks to thereby allow networked devices 218 and 220 to communicate with mobile devices 204 and 206. For example, use of WIG 214 may allow networked devices 218 and 220 and mobile devices 204 and 206 to exchange instant text and multi-media messages.

SMSC 208 is connected to a Home Location Register (HLR) 210. HLR 210 is utilized by SMSCs, as well as by mobile switches (not illustrated), in wireless network 202 to track the registered location of subscriber's mobile handsets thus facilitating delivery of mobile messages to the subscriber's handset. Additionally, HLR 210 maintains information about network subscribers including voice service subscribers, and the respective features and services associated with and available to the subscribers. As an example, an HLR includes information as to whether a user has subscribed to three way calling, voice mail or internet data services. Although not illustrated, it is understood that wireless network 202 may include multiple HLRs each respectively servicing multiple SMSCs and mobile switches. Moreover, it is understood that HLR 210 may service multiple SMSCs in addition to SMSC 208.

The system of FIG. 1 further includes a Signaling Control Point ("SCP") database 212. SCP database 212 maintains an account balance for each subscriber to the prepaid mobile messaging service. In accordance with the exemplary embodiment of the present invention as illustrated in FIG. 1, SCP database 212 is preferably the same database that maintains account balances for prepaid voice subscribers of wireless network 202. This allows efficiency of operation as well as maintenance of a minimal number of network components. As an example, SCP database 212 is a Lucent Enhanced Control Server (eCS). Although only a single SCP database is illustrated in FIG. 1 to promote clarity of understanding, it is understood that wireless network 202 may contain multiple SCPs to facilitate prepaid messaging functionality for large subscriber bases and to improve reliability of the prepaid service.

Additionally, SCP database 212 and SMSC 208 are preferably capable of communicating using transaction-based messaging. More particularly, SCP database 212 and SMSC 208 transmit packets of information, i.e., signaling data, between each other to facilitate prepaid mobile messaging operation. One skilled in the art will appreciate that the exact manner by which the signaling data is exchanged is not salient to the invention. An XML-based protocol using a modified version of HTTP version 1.1 may be utilized. Alternately, other signaling techniques may also be used, including LDAP or the Transaction Capabilities Applications Part ("TCAP") of Signaling System #7 to control communications between the signaling nodes. Signaling System #7 is defined by known American National Standards Institute (ANSI) standards, e.g., ANSI standards T1.110-1999 ("Signaling System # 7—General Information), T1.111-1996 (Signaling System #7—Message Transfer Part), T1.112-1996 (Signaling System #7—Signaling Connection Control Part Functional Description), T1.113-2000 (Signaling System #7—Integrated Services Digital Network (ISDN)) User Part, T1.114 (Signaling System #7—Transaction Capabilities Application Part (TCAP)) and T1.116-2000(Signaling System #7—Signaling System Number 7 (SS7)—Operations, Maintenance, and Administration Part (OMAP)).

In accordance with the described embodiment of the present invention, the prepaid mobile messaging service utilizes two types of transaction-based messages: a "debit message" and a "query message."

A debit message is sent from SMSC 208 to SCP database 212 and includes a request to debit the account of the prepaid subscriber identified by the information carried in the debit message. The debit message indicates the type of message, e.g., mobile originated or mobile terminated, leaving the task of calculating the charge for the message to SCP database 212. Alternately or additionally, the debit message may include an indication of the amount by which the subscriber's account is to be debited.

A "query message" is sent from SMSC 208 to SCP database 212 and includes a request that SCP database 212 inform SMSC 208 of the account balance of the prepaid subscriber identified by information in the query message. The role and function of a debit and query message will be more fully explained below.

The system of FIG. 1 operates in a manner such that an SMS message from an originating device arrives at its home (i.e., originating) SMSC 208 enroute to its ultimate destination. SMSC 208 determines whether the mobile message is being sent from a prepaid subscriber. If so, a determination is made whether delivery of mobile messages from the identified prepaid subscriber is blocked. If not blocked, the mobile message is then passed toward its ultimate destination.

Thereafter, SMSC 208 in cooperation with SCP database 212 debits the prepaid account of the prepaid subscriber by an appropriate amount based on the origination and destination of the mobile message. If an insufficient amount of funds are present in the prepaid subscriber's account, all future mobile messages to and from the prepaid subscriber will be blocked until such time that the prepaid subscriber's account is replenished.

Figure 2:
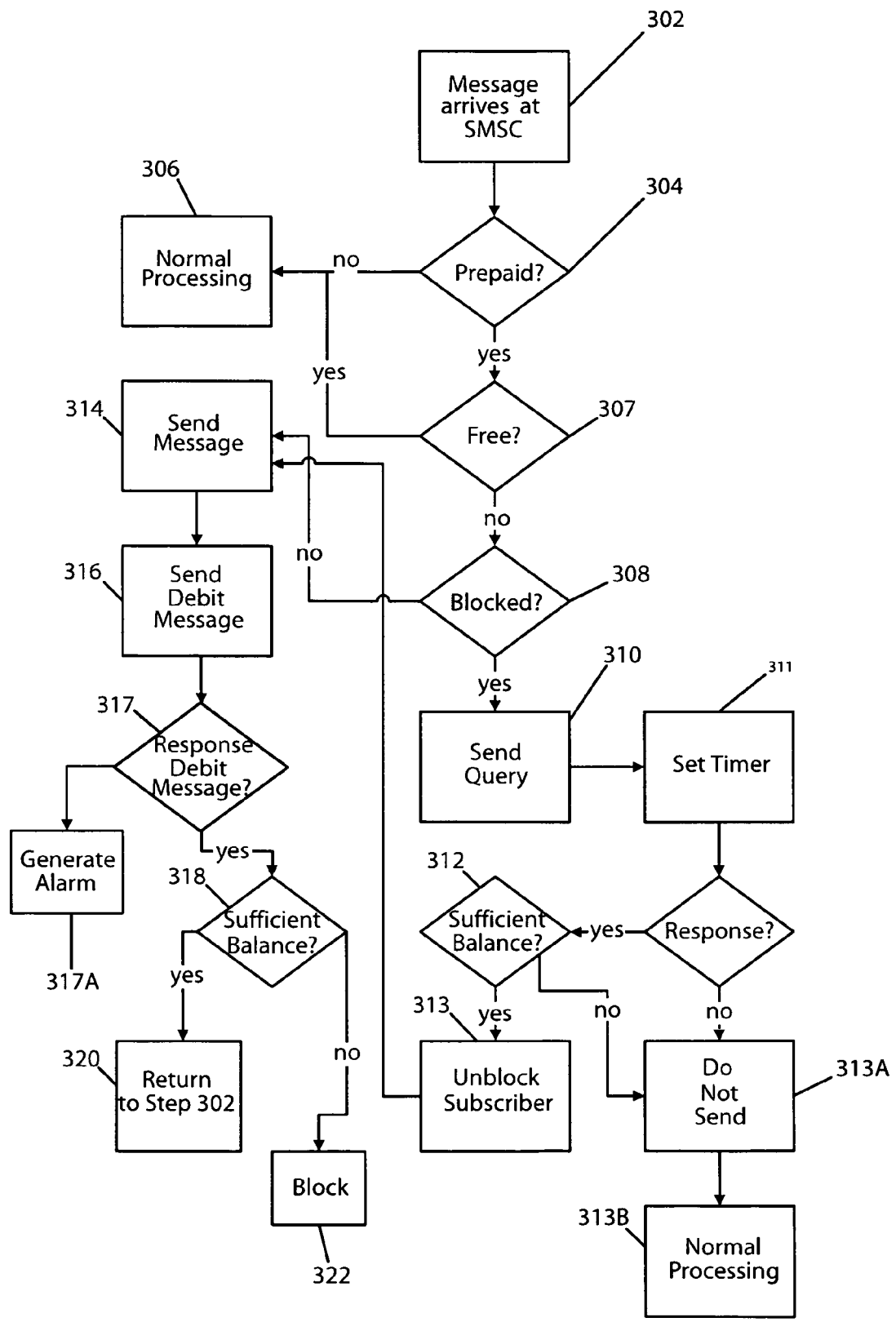
FIG. 2 illustrates an exemplary method of operation of a prepaid mobile messaging system designed in accordance with the present invention.

FIG. 2 illustrates more fully, in flow chart form, an exemplary method for facilitating prepaid SMS messaging in accordance with the present invention. The process of FIG. 2 is described with further reference to the components of FIG. 1.

Processing of mobile messages for billing purposes in general (i.e., for both pre-paid and post-paid mobile messaging) is preferably performed at the originating mobile message center for the originator of the mobile message and again separately at the respective terminating mobile message centers for each recipient of the mobile message. FIG. 1 shows only one mobile messaging center (SMSC 208), which may operate as both the originating and terminating mobile messaging center. However, one skilled in the art will appreciate that additional SMSCs may be used to spread the subscriber base among multiple home message centers.

Moreover, even in the case shown in FIG. 1, where the same device acts as both the originating and terminating mobile messaging center, two separate operations occur in sequence to process the prepaid message, one process for the message originating device followed by processing for the message terminating device. The process of FIG. 2 describes prepaid mobile message processing for an originating mobile message center.

The process of FIG. 2 begins at step 302 where an SMS message arrives at a mobile message center, e.g. SMSC 208. The mobile message at step 302 may have originated from a mobile source, e.g., mobile devices 204 or 206, or from a landline source, e.g., networked devices 218 or 220. Similarly, the mobile message is destined for one or more mobile or landline devices. The mobile message that arrives at step 302 includes an origination address identifying the originator of the message and one or more destination addresses identifying the one or more destinations of the mobile message.

At step 304, SMSC 208 examines the identity of the originating party and determines whether the originating party is a prepaid messaging subscriber. More particularly, SMSC 208 preferably references an internally-stored Class of Service of the originating party, and determines whether the originating party is a prepaid messaging subscriber.

In accordance with the exemplary embodiment of the invention described herein, SMSC 208 is preprogrammed in advance to identify mobile messaging subscribers who are prepaid mobile messaging subscribers. This may be accomplished by any of various methods, including Class of Service designation. The Class of Service designation may also identify the address of the SCP database used for prepaid service and responsible for managing the user's account. The SCP database address information may be directly encapsulated as part of the Class of Service or the Class of Service may provide a link to such information. For each prepaid subscriber, SMSC 208 also maintains an Account Blocked flag, the value of which indicates whether chargeable mobile messaging is to be blocked for the subscriber. If at step 304, SMSC 208 determines that the originating party is not a prepaid messaging subscriber, the system proceeds to step 306 where normal processing of the message continues.

If, however, at step 304, SMSC 208 determines that the originating party of the mobile message is a prepaid messaging subscriber, the method proceeds to step 307 to determine if the mobile message is a "free" message for which a charge is not to be assessed, e.g., an administrative message provided by the wireless carrier. If at step 307 it is determined that the message is a "free" message, the process continues to step 306 and normal processing resumes at step 306. If, however, it is determined at step 307 that the mobile message is not a "free" message, the process continues at step 308 where SMSC 208 determines if messages for the prepaid mobile messaging subscriber are blocked. Mobile messages to and from a prepaid mobile messaging subscriber are blocked when a determination of insufficient prepaid mobile messaging funds has been previously determined.

If at step 308, the system determines that mobile messages are blocked for a prepaid subscriber, the process continues to step 310 where SMSC 208 sends a query message to SCP database 212 preferably to request the account balance of the prepaid subscriber identified by information in the query message. The query message includes the identity of the prepaid subscriber, preferably utilizing the prepaid subscriber's Mobile Directory Number ("MDN") or, alternately, the prepaid subscriber's Mobile Identification Number ("MIN").

At step 311, SMSC 208 sets a timer and waits for a response to the query message from SCP database 212. If, after a predetermined amount of time, no response to the query message is received from SCP database 212, SMSC 208 may either proceed to step 314 (step not illustrated) and send the messages toward the intended destination, thus incurring a risk of lost revenue without interrupting the subscriber's messaging experience or, alternately, SMSC 208 may proceed to step 313A and discard the message and prevent delivery of the same to the intended destination. Other corrective measures deemed necessary by the system administrator may also be taken. If, however, a response to the query message is received from SCP database 212 within the allotted time period, the process moves to step 312 where SMSC 208 reviews the balance of the subscriber's account as contained in the query message response and makes a determination whether a sufficient amount of funds exists in the prepaid subscriber's account to allow mobile message delivery. If SMSC 208 determines that a sufficient balance exists, SMSC 208 unblocks the prepaid subscriber's account (step 313) and proceeds to step 314 where it sends the mobile message toward its intended destination.

If however, SMSC 208 determines at step 312 that there remains an insufficient balance in the prepaid subscriber's account to allow mobile message delivery, the process continues at step 313A and does not allow delivery of the mobile message to its intended destination. Additionally, the prepaid subscriber's account remains blocked. The process then continues at step 313B with normal processing which may include a return to step 302.

One skilled in the art will appreciate that if the mobile message is intended for more than one destination, SMSC 208 may be programmed to make a determination of sufficient funds at step 312 based on the number of intended destinations. Thus, more funds may be required to send a message to a plurality of message recipients rather than to a single recipient.

Returning to step 308 of the process of FIG. 2, if SMSC 212 determines that the mobile message is not blocked, the process continues to step 314 and the mobile message is sent toward its one or more intended destinations via the terminating mobile message centers of the destination devices in the normal manner.

Upon successful message forwarding, the process continues to step 316. At step 316, SMSC 208 sends a debit message to SCP database 212. The debit message includes the identity of the prepaid subscriber from which the mobile message was received. Preferably, the identity utilized by the debit message is the MDN of the prepaid subscriber. The debit message may also include information identifying both the origination and one or more destinations of the mobile message. This additional information might be utilized by SCP database 212 in determining the amount of funds to charge the prepaid subscriber's debit account to deliver the mobile message. In any event, the debit message causes SCP database 212 to debit the prepaid subscriber's debit account by an appropriate amount of funds. If necessary, the account may be debited to a negative balance in the event an insufficient amount of prepaid funds exists to cover the charge.

At step 317, SMSC 208 sets a timer for a predetermined amount of time and waits for a response to the debit message from SCP database 212.

If no response is received from SCP database 312 at step 317 to the debit message, an alarm may be generated (step 317A) alerting a system administrator of a failure in system processing. Other appropriate measures may be taken to facilitate proper system operation and corrective action.

If however, a response is received, the process proceeds to step 318.

At step 318, SMSC 208 determines if the response is an affirmative response debit message, i.e., indicating that the cost of the mobile message was withdrawn from the subscriber's account, or if the response was a negative response debit message, i.e., indicating that the total cost of the message was not withdrawn from the prepaid subscriber's prepaid account.

If the response was an affirmative response debit message, SMSC 208 unblocks messaging for the subscriber (if not already unblocked) and returns to normal processing at step 320. Normal processing may include a return to step 302 to await additional mobile messages.

If, however, the response was a negative response debit message, i.e., indicating that there was an insufficient amount of funds in the prepaid mobile messaging subscriber's account to cover the delivery of the mobile message at step 314, SMSC 208 proceeds to step 322 and changes its stored status of the prepaid subscriber to "blocked" (if it is not already set to "blocked"), thus preventing delivery of additional mobile messages from and to the prepaid subscriber until the prepaid subscriber's account is sufficiently replenished. Preferably at this point, SMSC 208 discards any currently stored messages for the prepaid subscriber.

One skilled in the art will appreciate that the exact format and information carried by, as well as the exact responses of SMSC 208 and SCP database 212 to, the information in the query and debit messages are not salient to the present invention except to the extent that proper querying and debiting of the prepaid accounts is facilitated. Thus, as the example above illustrates, SMSC 208 may specify to SCP database 212 the amount of funds to be deducted from the prepaid subscriber's account or alternately, SCP database 212 may make this determination on its own based on information provided by SMSC 208 in the debit message.

As discussed previously, processing of prepaid mobile messages is preferably carried out in separate sequential processes, first for the message originating device at the originating message center and then for the one or more mobile message destination devices at the respective terminating messaging centers. Processing in this manner is preferred because message handling by the network involves separate processing for message submission by the originator and message delivery to the destination. The process of FIG. 2 was described above for an originating messaging device at an originating message center. The process performed for destination message devices at terminating message centers is performed in a substantially similar manner. Thus, one skilled in the art will further appreciate that a mobile message may pass through multiple SMSCs before reaching its final destination. In accordance with the above-described exemplary embodiment of a system and method to facilitate prepaid mobile messaging, all mobile messages sent from or to a non-blocked prepaid subscriber are forwarded to their intended destination without first verifying that a sufficient amount of funds currently exists in the prepaid subscriber's account to cover the charge for mobile message delivery. As the volume and frequency of mobile messaging increases, the present invention serves to dramatically reduce latency in mobile message processing which might otherwise be introduced if the prepaid system confirmed sufficient funds prior to delivering each and every prepaid mobile message. The blocking feature limits the mobile messaging provider's exposure to undue fraud and abuse by allowing only a minimal number of mobile messages to be delivered after the prepaid subscriber has exhausted available prep-paid funds.

Variations in the above-described exemplary embodiment of the system and method of the present invention may be realized without departing from the scope of the present invention, which is defined solely by the claims that follow.

For example, the present invention may be applied to wireless services other than mobile messaging. Prepaid accounts for other value-added data services provided by a wireless network carrier may be effectively and efficiently maintained and debited in accordance with the present invention without introducing undue latency into the network. Such value-added services may include, e.g., e-mail, gaming and web browsing applications. Design and operation of such systems would proceed similar to that described in FIGS. 1 and 2 where such services are provided via a message center such as SMSC 208. Alternately, a separate application server may be utilized in place of SMSC 208 to facilitate the respective services. In such instances, the application server communicates with SCP database 212 in a manner similar to the operation of SMSC 208, to authorize and debit prepaid services.

We claim:

1. A method for providing a prepaid subscriber with mobile messaging, the method including the steps of:
   receiving a mobile originated message from the prepaid subscriber at a message center;
   sending the mobile message toward its intended one or more destinations without first verifying that a prepaid mobile messaging account associated with the prepaid subscriber has an amount of funds sufficient to cover a charge for the mobile message origination; and
   debiting the prepaid mobile messaging account associated with the prepaid subscriber by the amount of funds sufficient to cover the charge for the sent mobile message origination.

2. The method of claim 1, further including the step of blocking the account of the originator of the mobile message if the amount of funds in the debited account are not sufficient to cover the charge for the sent mobile message origination.

3. The method of claim 1, further including the step of determining whether the party originating the mobile originated message is a prepaid subscriber based upon a Class of Service associated with the identity of the originating party.

4. The method of claim 1, wherein the mobile message is an SMS message, the message center is a Short Message Service Center and the prepaid mobile messaging account is stored in a database accessed through a service control point ("SCP").

5. The method of claim 1, wherein the debiting step utilizes transaction-oriented processing.

6. The method of claim 1, wherein the debiting step utilizes a debit message.

7. The method of claim 1, further including the step of determining the amount of funds sufficient to cover the charge assessed on the originating party for the sent mobile message origination.

8. The method of claim 1, further including the step of determining whether the mobile originated message originated by the prepaid subscriber is to be blocked before the sending step.

9. The method of claim 1, wherein the steps of receiving and sending occur at an originating mobile message center.

10. The method of claim 1, further comprising the step of, after sending the mobile message, sending a debit message to a prepaid server requesting that the amount of funds sufficient to cover the charge for the sent mobile message origination be debited from the prepaid mobile messaging account.

11. The method of claim 10, wherein if a response from the prepaid server indicates that the prepaid mobile messaging account could not be debited, blocking the prepaid mobile mesaging account of the originator of the mobile message.

12. A method for providing a prepaid subscriber with mobile messaging, the method including the steps of:
receiving a mobile message addressed to a prepaid subscriber at a message center;
sending the mobile message to the addressed prepaid subscriber without first verifying that a prepaid mobile messaging account associated with the addressed party of the mobile message has an amount of funds sufficient to cover a charge for the mobile message termination; and
debiting the prepaid mobile messaging account associated with the addressed party of the mobile message by the amount of funds sufficient to cover the charge for the sent mobile message termination.

13. The method of claim 12, further including the step of blocking the account of the addressed party if the amount of funds in the debited account are not sufficient to cover the charge for the sent mobile message termination.

14. The method of claim 12, further including the step of determining whether the addressed party for a mobile terminated message is a prepaid subscriber based upon a Class of Service associated with the identity of the addressed party.

15. The method of claim 12, further including the step of determining the amount of funds sufficient to cover the charge assessed on the addressed party for the sent mobile message termination.

16. The method of claim 10, further including the step of determining whether a mobile terminated message addressed to the prepaid subscriber is to be blocked before the sending step.

17. The method of claim 12, wherein the steps of receiving and sending occur at a terminating mobile message center.

18. The method of claim 12, further comprising the step of, after sending the mobile message, sending a debit message to a prepaid server requesting that the amount of funds sufficient to cover the charge for the sent mobile message termination be debited from the prepaid mobile messaging account.

19. The method of claim 18, wherein if a response from the prepaid server indicates that the prepaid mobile messaging account could not be debited, blocking the prepaid mobile messaging account of the addressed party.

20. A system for providing prepaid mobile messaging, the system, comprising:
one or more databases for storing account balances associated with prepaid mobile messaging subscribers; and
one or more message centers for routing a mobile message, the mobile message being associated with one or more prepaid mobile messaging subscribers, the one or more message centers being programmed to reference the one or more databases to debit the account balance or balances associated with the one or more prepaid messaging mobile messaging subscribers after the one or more message centers routes the mobile message to its one or more intended destinations,
wherein the mobile message is routed without first verifying that the account balance or balances associated with the one or more prepaid mobile messaging subscribers has an amount of funds sufficient to cover the charge for routing the mobile message.

21. The system of claim 20 wherein the one or more message centers are further programmed to reference a Class of Service to determine whether the party originating a mobile originated message is a prepaid subscriber.

22. The system of claim 20 wherein the one or more message centers are further programmed to reference a Class of Service to determine whether the party to which a mobile terminated message is addressed is a prepaid subscriber.

23. The system of claim 20, wherein the mobile message is an SMS message, the one or more message centers are short message service centers and the one or more databases are accessed through a service control point ("SCP").

24. The system of claim 20, wherein the one or more message centers are programmed to determine the blocked status of each of the one or more prepaid subscribers before routing a chargeable message to its one or more intended destinations.

25. The system of claim 20, wherein the one or more message centers reference an Account Blocked flag to determine the blocked status of each of the one or more prepaid mobile messaging subscribers.

26. The system of claim 20, wherein the one or more message centers is also for, after the one or more message centers routes the mobile message, sending a debit message to one or more prepaid servers requesting that the account balance or balances associated with the one or more prepaid messaging mobile messaging subscribers be debited.

27. The system of claim 26, wherein if a response from the one or more prepaid servers indicates that the account balance or balances associated with the one or more prepaid messaging mobile messaging subscribers could not be debited, setting one or more Account Blocked flags indicating a blocked status of the one or more prepaid mobile messaging subscribers.

28. A method for providing prepaid mobile data services, the method including the steps of:
receiving a request to provide a mobile data service at an application server;
sending the mobile data service to its intended recipient without first verifying that a prepaid mobile data service account associated with an addressed party of the sent mobile data service has an amount of funds sufficient to cover a charge for the mobile data service; and
debiting the prepaid mobile data service account associated with the addressed party of the sent mobile data service by the amount of funds sufficient to cover the charge for the sent mobile data service.

29. The method of claim 28, including the additional step of:
blocking the account of the addressed party if the amount of funds in the debited account are not sufficient to cover the charge for the sent mobile data service.

30. The method of claim 28, further including the step of determining the amount of funds sufficient to cover the charge for the sent mobile data service.

31. The method of claim 28, further including the step of determining whether mobile data services for the addressed party are blocked before the sending step.

32. The method of claim 28, wherein the addressed party is one of an originating and a terminating party of the mobile data service.

33. The method of claim 28, further comprising the step of, after sending the mobile data service, sending a debit message to a prepaid server requesting that the amount of funds sufficient to cover the charge for the sent mobile data be debited from the prepaid mobile data service account.

34. The method of claim 33, wherein if a response from the prepaid server indicates that the prepaid mobile data service account could not be debited, blocking the prepaid mobile data service account of the addressed party.

\* \* \* \* \*

UNITED STATES PATENT AND TRADEMARK OFFICE
CERTIFICATE OF CORRECTION

PATENT NO. : 7,092,697 B1  
APPLICATION NO. : 10/337240  
DATED : August 15, 2006  
INVENTOR(S) : Jerry Kupsh et al.

It is certified that error appears in the above-identified patent and that said Letters Patent is hereby corrected as shown below:

On Title Page, Item (73)  
In the Assignee:

Please delete "Cellco Partnership, Bedminister, NJ (US)" and substitute

-- Cellco Partnership D/B/A Verizon Wireless, Bedminister, NJ (US) --.

Signed and Sealed this

Ninth Day of January, 2007

JON W. DUDAS  
*Director of the United States Patent and Trademark Office*